US005858514A

United States Patent [19]

Bowers

[11] Patent Number: 5,858,514

[45] Date of Patent: Jan. 12, 1999

[54] COATINGS FOR VINYL AND CANVAS PARTICULARLY PERMITTING INK-JET PRINTING

[75] Inventor: Wade Bowers, Fairburn, Ga.

[73] Assignee: Triton Digital Imaging Systems, Inc., Solana Beach, Calif.

[21] Appl. No.: 292,432

[22] Filed: Aug. 17, 1994

(Under 37 CFR 1.47)

[51] Int. Cl.$^{6}$ .......... B32B 3/00

[52] U.S. Cl. .......... 428/195; 428/199; 428/204; 428/207; 428/212; 428/411.1; 428/476.9; 428/478.2; 428/500; 428/520; 428/524; 427/466; 427/487; 427/500; 427/501; 427/504; 427/510; 427/511; 347/102; 347/103; 346/135.1; 346/136

[58] Field of Search .......... 428/195, 199, 428/207, 204, 212, 411.1, 476.9, 478.2, 500, 520, 524; 346/135.1, 136; 347/102, 103; 427/466, 487, 500, 501, 504, 510, 511

[56] References Cited

U.S. PATENT DOCUMENTS

| | | | |
|---|---|---|---|
| 4,680,235 | 7/1987 | Murakamo | 428/414.4 |
| 4,702,742 | 10/1987 | Iwato et al. | 8/495 |
| 4,758,461 | 7/1988 | Akiya et al. | 428/212 |
| 5,051,273 | 9/1991 | Maeda et al. | 427/447 |
| 5,099,256 | 3/1992 | Anderson | 347/103 |
| 5,198,487 | 3/1993 | Kissel | 524/403 |
| 5,215,739 | 6/1993 | Kamishita et al. | 424/45 |
| 5,232,691 | 8/1993 | Lemole | 424/78.02 |
| 5,264,471 | 11/1993 | Chmelir | 524/35 |
| 5,273,798 | 12/1993 | Miner | 428/41.5 |
| 5,279,862 | 1/1994 | Corcoran et al. | 427/407.1 |
| 5,279,885 | 1/1994 | Ohmori et al. | 428/195 |

*Primary Examiner*—Leszek Kiliman
*Attorney, Agent, or Firm*—Fuess & Davidenas

[57] ABSTRACT

A method and related compositions for preparing a substrate for printing are described. The invention comprises coating a non-paper substrate with an adherent base coat and a hydrophilic top coat. The base coat adheres to the substrate and the top coat, which is applied to the base coat and adheres to it, provides an ink receptive surface on which ink pigment can be deposited. A base coating composition comprises a type-A gelatin and an acrylic polymer. A top coating composition comprises a type-A or type-B gelatin and a hydrophilic organic polymer. A base- and top-coated substrate of the invention is particularly suited for use with ink-jet printers that employ aqueous-based inks. Printing substrates include such materials as canvas, leather, polymeric films and sheets, and the like.

40 Claims, No Drawings

COATINGS FOR VINYL AND CANVAS PARTICULARLY PERMITTING INK-JET PRINTING

TECHNICAL FIELD

The present invention relates to compositions and methods for coating substrates in order to prepare them for printing. The invention especially relates to preparing non-paper substrates for printing with an ink-jet printer.

CITED REFERENCES

U.S. PATENT DOCUMENTS

U.S. Pat. No. 5,279,885 issued to Ohmuri et al.;

U.S. Pat. No. 4,680,235 issued to Murakami et al.;

U.S. Pat. No. 4,758,461 issued to Akiya et al.

OTHER REFERENCES

Larson, M., Packaging, pp.49, (Dec. 1991);

*Kirk-Othmer, Encyclopedia of Chemical Technology,* John Wiley & Sons (1993);

*Encyclopedia of Polymer Science and Engineering,* John Wiley & Sons (1987), v. 1, 7.

BACKGROUND OF THE INVENTION

In recent years, the applications of digital imaging technologies have flourished. As the costs of computation continue to decline and the sophistication of imaging programs increases, more applications of imaging technology become apparent. These applications range from the relatively mundane, such as document imaging, to the relatively esoteric, such as virtual reality imaging. It is becoming apparent that the market potential of computerized imaging techniques has only begun to be realized.

Among the many existing and potential applications of imaging technologies is the digitized imaging of photographs, paintings, and the like, and facsimiles thereof. Once such images are obtained in digitized form, either by conversion of an analog original or by direct production, as with a computer-aided design (CAD) system, they can be manipulated in a virtually unlimited number of ways. For example, the images can be enhanced with respect to color, contrast or size, "cut and pasted" onto a different image, and formatted on a timeline to produce a motion picture.

A typical imaging system comprises a computer having adequate storage capacity to record the image to be processed, an image production device, such as a scanner, to digitize the original image, an image processor, which is designed to speed up the available image manipulations, and an output device where the processed image is received. Although each of the above-mentioned components of a typical imaging system continues to evolve as the technology advances, the final stage of image processing, namely, the transfer of a processed image onto a desired medium, is of particular interest herein.

The relatively low cost and convenient use of ink-jet printers make such printers the generally preferred devices for recording processed images. Unfortunately, the acceptability of the recorded images produced with ink-jet printers is in many cases highly dependent on the recording medium. Conventionally, the recording medium used with an ink-jet printer is paper, which is provided as a plain-type or coated-type paper. However, for many applications, such as for the imaging of portraits, paper is not a suitable recording medium. Other recording media that would preferably be used under many circumstances include artist's canvas, textiles, leather, and durable plastic sheets.

Key among the concerns in using any recording medium are the extent to which the medium permits "print through" of ink and the extent to which the medium resists ink absorption. In the case of "print through," the ink penetrates through the medium and can readily be perceived from the opposing side. This is particularly problematic when large amounts of ink are employed, as in full-color printing. On the other hand, whenever the print medium resists ink absorption, blotting or feathering of ink on the surface can occur since the ink is not sufficiently absorbed into the medium.

Frequently, a sizing agent, which fills the pores of the recording medium, is employed in an effort to give the medium the desired balance of ink absorptivity and penetration resistance, especially when the medium would otherwise have excessive ink penetration. For example, U.S. Pat. Nos. 5,279,885 and 4,785,461 propose recording sheets for use with ink-jet printers comprising fibrous base material and several sizing agents. However, it is often found that sizing agents tend to migrate over time in the recording medium, thereby causing changes in the ink absorptivity of the medium and reducing overall print quality of the recorded image.

In other cases, the desired recording medium resists ink penetration excessively, such as with nonporous or coated porous substrates. An example of the latter kind of substrate is that of porous corrugated packages coated with clay-based or other coatings, which coatings improve the flexographic printing properties of the packages. An approach to rectifying the poor ink absorptivity for ink-jet printing of these packages has been proposed (see, e.g., Larson, M., *Packaging,* pp.49, (December 1991)), which involves reformulating the water-based inks to include acrylic-based or alcohol-based formulations. However, reformulating the inks likely would require making adjustments to printheads and other machine components.

The printing of nonporous substrates with an ink-jet printer has received generally less study than the printing of porous substrates. For example, a recording material comprising a nonporous base material and a surface recording layer formed thereon has been proposed (U.S. Pat. No. 4,680,235). The surface recording layer reportedly is formed at least with a surface active agent that does not form an insoluble material in the ink, and optionally, is formed with a binder agent which is soluble in or swells in an aqueous ink. The charge of the surface active agent, e.g., cationic, anionic or neutral, in the surface recording layer apparently must be matched with the charge of the dye present in the ink composition. Few nonporous substrates are shown to be ink-jet printable with this approach.

Although much effort has been expended on adapting paper and paper-like media for use with high speed printers, such as full-color ink-jet printers, little success is noted for adapting non-paper media for use with such printers. It is believed that this is not due so much to an unrecognized market for such applications as much as to the continued failure of those in the field to develop such materials or possibly the widespread belief that such applications are not possible. Accordingly, it is desired to provide novel recording media that can be used with ink-jet printers, which high ink absorptivity yet show acceptably low "print-through" characteristics. In particular, it is desired to provide novel recording media prepared from such substrates as canvas, textiles, and polymeric sheets and films. Such recording media are expected to offer qualities, such as improved aesthetics, durability, and the like, which are not attainable with conventional paper and other fibrous materials.

SUMMARY OF THE INVENTION

The present invention is for a method and related compositions for preparing a substrate for printing. One aspect of the invention relates to preparing non-paper substrates for printing. Another aspect of the invention relates to preparing a substrate particularly for ink-jet printing. Inasmuch as paper type substrates are generally suitable for use with ink-jet printers, the present invention is contemplated to be particularly useful for adapting non-paper substrates for printing with an ink-jet printer.

A broad aspect of a method of the invention involves rendering a substrate suitable for printing by joining a surface layer to the substrate. One side of the surface layer adheres to the substrate and the opposing side of the surface layer is suitable for printing thereon, as with an aqueous-based ink. The surface layer can be joined to the substrate by applying a single coating composition to the substrate, which coating composition contains a material adherent to the substrate and a hydrophilic material. The adherent material can be a gelatin and/or an organic polymer, such as an acrylic polymer, and the hydrophilic material can be a gelatin.

In a narrower aspect of the invention, a printing method comprises applying to the substrate a first (base) coating which adheres to the underlying substrate. The method further comprises applying a second (top) coating to the underlying substrate and first coating, with the second coating binding to the first coating and capable of receiving, e.g., irreversibly accepting, at least one printing ink. When an aqueous-based printing ink is employed, it is preferred that the second (top) coating is hydrophilic in order to absorb at least some of the aqueous carrier of the ink, thereby depositing ink pigment on the surface of the coated substrate.

A particularly preferred aspect of the invention is a method that comprises applying an adherent (base) coating to an underlying substrate, which adherent coating contains a gelatin and an organic polymer. The gelatin and organic polymer either independently or synergistically impart sufficient adhesive properties to the coating to effectively bond it to the substrate. The method further comprises applying to the base coat a hydrophilic (top) coating, which bonds to the underlying base coat and presents an ink-receptive surface suitable for printing. The hydrophilic coating preferably contains a second gelatin and a second organic polymer, which provide the hydrophilic and ink-receptive properties of the layer.

A preferred composition for providing an instant base coat, which adheres to a selected substrate, comprises water, a type-A gelatin, and an organic polymer, which polymer promotes adherence to the substrate. A preferred class of organic polymer, which adheres to such substrates as fabrics and polyethylene-based polymers, is selected from the homopolymers and copolymers of acrylic acid, and derivatives thereof.

A preferred composition for providing an instant top coat, which adheres to an aforementioned base coat and provides a surface for printing, comprises a gelatin and a water-soluble polymer. The water-soluble polymer is preferably selected from such natural and synthetic polymers as polyvinyl pyrrolidons PVP), polyethylene oxide (PEO), and gum arabic. The gelatin is preferably selected from type-A and type-B gelatins.

The above-described substrate preparation method and coating compositions in principle can be used with many types of printing substrates, including conventional paper substrates. However, substrates where the instant method and compositions are found to be particularly useful are non-paper type substrates, such as fabrics and plastics. Some exemplary preferred substrates include artist's canvas, leather, and polymeric sheets, such as flexible polyvinyl (polyethylene) sheets, as well as related materials.

Accordingly, a substrate coated with an above-described coating is contemplated. The substrate can be coated with a single layer or with multiple layers of one of the coating compositions. Typically, a substrate is coated with both an adherent base coat and a hydrophilic top coat. Either or both coatings can be formed by applying multiple layers of the coating; however, each coating is usually composed of a single layer formed by a single application of the coating composition, e.g., by dip coating.

A preferred substrate can be porous, such as artist's canvas, or substantially nonporous, such as a polymer sheet. In the case of porous substrates, a sizing can be included in the formulation for the top and/or base coating in order to prevent excessive penetration of ink into the body of the substrate. In the case of nonporous substrates, excessive ink penetration is not problematic, however, the non-absorptive properties of such substrates increases the likelihood of excessive pooling, smearing, and tackiness of ink deposited on the substrate. In this case, an instant coating composition on the substrate provides sufficient solvent absorption to prevent the latter undesired printing characteristics.

Also contemplated are a printing method and system employing an above-described coated substrate. Such a printing method comprises applying an ink to an above-described coated substrate. When the ink is aqueous-based, as is commonly employed in ink-jet printers, the water vehicle of the ink is absorbed by a coating layer and the ink pigment is deposited on the surface of the substrate. Hence, a preferred printing method employs an ink-jet printer to apply the ink to the coated substrate. A preferred printing system of the invention comprises: (i) an ink-jet printer; (ii) an above-described coated substrate, preferably a base- and top-coated substrate; and (iii) means for controllably imprinting a desired ink pattern on the substrate with the ink-jet printer.

A fuller understanding of the present invention can be obtained by a study of the following detailed description and the appended claims.

DETAILED DESCRIPTION OF THE INVENTION

The present invention is described hereinbelow first in terms of the method of making a coated substrate of the invention. The coating compositions and end products of the invention are then described in detail. Finally, printing methods and systems employing a coated substrate of the invention are described.

Method of Preparation

A method of the invention is for coating a substrate in preparation for printing thereon, such as with an ink-jet printer. A preferred method comprises: (1) applying to the substrate a base coating composed of a first gelatin and a first organic polymer, which base coating adheres to the substrate; and (2) applying to the base coating a hydrophilic coating composed of a second gelatin and a second organic polymer, which hydrophilic coating adheres to the base coating.

The first and second gelatins can be identical or different as needed, with the selection depending primarily on the type of substrate used. Similarly, the first and second polymers can be the same or different, depending primarily on the substrate. Usually, the polymers will be different, however.

The manner of applying either or both of the coatings depends on the size and nature of the substrate, e.g., its flexibility. Preferably, the coatings are applied by a commercial dip process, which covers the substrate thoroughly with a given coating. Excess coating material is typically removed by a knife or blade apparatus, depending on substrate type.

Usually, a substrate employed with the invention is not composed substantially of paper, and frequently it is substantially absent paper or related material. The substrate can be fibrous, such as is a canvas material, or otherwise porous, such as is leather. The substrate can also be substantially nonporous, as is a polymeric sheet or film.

More particularly, a method of preparing a substrate for accepting and retaining a water-based ink is contemplated, as during printing. Such a preparation method comprises: (a) coating the substrate with a base coat containing a first polymer which chemically adheres to the substrate, and a first gelatin; and (b) coating the base-coated substrate with a top ink-receptive coat containing a second polymer and a second gelatin, which adheres to the first gelatin of the base coat and is capable of absorbing water in a water-based ink.

While not wishing to be limited to a particular theory of operation, it is believed that during an application of water-based ink to the base- and top-coated substrate, the top ink-receptive coating absorbs water from the ink concurrent with at least some dissolution of the second polymer of the top coating in the ink. In this way, it is believed that the water carrier of the ink is wicked preferentially into the coated substrate, and that dissolution of polymer into the remaining components of the ink promotes deposition of the ink on the substrate surface. Accordingly, the ink is fixed to the top coating and thus to the base- and top-coated substrate.

Although the invention has been described above primarily in terms of a two-step process comprising applying a base coat to the substrate and then an ink-receptive top coat, it should be appreciated that in certain cases a single coating and a single application step can suffice. A single coating process of the invention is especially preferred for use with a substrate that adheres to the coating and resists ink penetration sufficiently that detachment of the coating and/or ink print-through do not occur. A preferred substrate suitable for use with a single-step coating process of the invention is a sized canvas.

As with the above-described two-step process, when a single coating is employed the coating should adhere to the underlying substrate and should be sufficiently hydrophilic to preferentially absorb solvent from an aqueous ink, thereby depositing the ink onto the surface of the substrate. An exemplary single-coat process employs an ink-receptive top coating composition as described hereinbelow, preferably further including an adherent acrylic copolymer as decribed hereinbelow for an adherent base coating. Hence, a further substrate preparation method of the invention comprises applying a single coating composition to the substrate, which coating composition comprises a gelatin, a polymer adherent to the substrate, and a water-soluble polymer. Exemplary components are described hereinbelow.

Coating Compositions-Adherent Base Coating

A composition suitable for preparing an instant subcoat for vinyl substrates comprises water, a gelatin, and an acrylic polymer. A preferred gelatin is derived from porkskin via an acid-process (type-A gelatin). A preferred acrylic polymer is in its free carboxylate form and is present typically as a copolymer with another monomer. The polymer is selected for its properties of water solubility, molecular weight, and its pliability on a vinyl substrate. The base coat composition has a basic pH and preferably has a pH in the range 8–9.

Noting that to date, no unifying theory of adhesive bonding exists that explains intermolecular interactions which take place between an adhesive and its adherend, the present invention should not be limited to a particular theory of operation. Factors that are considered important in optimizing the adhesion between a target substrate and an instant base coating include the wettability of the substrate with the coating, the mechanical roughness of the substrate surface, the viscosity of the base coating, and any mutual solubility between the coating and the substrate.

Gelatins are high molecular weight polypeptides derived from animal collagen. Different types of gelatin are obtained from collagen depending on the chemical transformation process used to denature and extract the collagen. Acid pretreatment processes yield type-A gelatins, whereas alkaline pretreatments yield type-B gelatins. Gelatins prepared by alkaline pretreatments are distinguished from those processed in acid by the hydrolysis of terminal amide groups. After pretreatment, the gelatin stock is extracted and further processed to produce a commercial product. The resulting gelatins can be characterized by such properties as density, refractive index, average molecular weight, viscosity, gel rigidity (Bloom test), glass transition temperature, moisture content, isoionic pH, etc. Of these physical properties, type-A and type-B gelatins typically differ most markedly with respect to their isoionic pH values, with the type-A gelatins having pH=7–9 and type-B gelatins having pH=4.8–5.2.

A preferred gelatin that can compose an instant vinyl or canvas subcoat composition is selected from type-A and type-B gelatins, including combinations thereof. Particularly preferred gelatins are obtained from Kraft General Foods (Woburn, Mass.) or Atlantic Gelatin (div. of Kraft General Foods). A preferred wt % range for a gelatin in an instant subcoating composition is 2–6 wt %, more preferably about 4 wt %.

Acrylic polymers are preferably used in an instant vinyl or canvas subcoat composition. The acrylic polymer serves primarily as an adhesive to bind the subcoat to the substrate. The polymer can also serve to reduce penetration of ink into the substrate, such as when a canvas substrate is used. Acrylic and methacrylic polymers or elastomers are preferred because they are readily soluble in water, particularly when they are provided in their basic salt form and cross-linking by forming anhydride bridges has been avoided. Equilibrium water absorption for poly(acrylic)acid at 30° C. and 50% relative humidity is about 8 g water polymer, and is about 42 mg for the sodium salt of the polymer. Solutions of acrylic acid polymers present at a concentration of 3% or more are considered to be concentrated. Strong laminates of aluminum foil and polypropylene have been prepared using poly(acrylic)acid as the adhesive. They are also used in paper-size formulations.

Polyvinyl acetates can also be used, preferably as copolymers of acrylates or maleates in order to plasticize the polymer sufficiently that it has a glass transition temperature below room temperature.

Some exemplary acrylic homopolymers for use in an instant base coating composition are listed hereinafter (the compounds are named according to the IUPAC nomenclature system). The compounds have the general formula —[(ROCO) $CHCH_2$]— (poly (alkyl acrylate). Some of the compounds include: poly[1-(carboxycarbonyl)ethylene] (poly(acrylic acid, PAA), poly[1-(benzyloxycarbonyl) ethylene], poly[1-(butoxycarbonyl)ethylene], poly[1-(secbutoxycarbonyl)ethylene], poly[1-(butoxycarbonyl)-1cyanoethylene], poly[1-(butylcarbamoyl)ethylene], poly [1-(carbamoyl)ethylene] (polyacrylamide, PAM), poly[1-(carboxy)ethylene], poly[1-(2-chlorophenoxycarbonyl) ethylene], poly[1-(4-chlorophenoxycarbonyl)ethylene], poly[1-(4-cyanobenzyloxycarbonyl)ethylene], poly[1-(2-cyanoethoxycarbonyl)ethylene], poly[1-(cyanomethoxycarbonyl)ethylene], poly[1-(4-cyanophenoxycarbonyl)ethylene], poly[1-(cyclohexyloxycarbonyl)ethylene], poly[1-(2,4-dichlorophenoxycarbonyl)ethylene], poly[1-(dimethylcarbamoyl)ethylene], poly[1-(ethoxycarbonyl) ethylene] (poly(ethyl acrylate), PEA).

Other acrylates, including methacrylates, are apparent to skilled practitioner without undue experimentation. Notably, acrylate-based copolymers comprised of one or more of the monomers identified in the above polymers, can be employed, and are often preferred. Additionally, plasticizers can be employed in order to optimize the glass transition temperature, and viscosity, of the polymer.

A particularly preferred adherent polymer for use in subcoat compositions for polyvinyl substrates has brand name LS-20, which is a carboxylated acrylic copolymer obtained from Allied Colloid, Inc. (Suffolk, Va.). A preferred wt % range of polymer in the composition is 25–75wt %, more preferably 40–60 wt %.

When a porous substrate, such as canvas, is employed, a sizing is frequently used, particularly in the undercoating, in order to prevent excessive ink absorption by the substrate. A preferred sizing component is starch, present in about 0.1–1.0 wt % of the composition.

Ink-receptive Top Coating

An ink-receptive top coating composition of the invention contains water, a gelatin, and a water-soluble polymer. The gelatin serves as a hydrophilic matrix into which a water-based ink penetrates and is absorbed. The water-soluble polymer can facilitate the absorption of water in the matrix by reducing its surface tension. However, the primary function of the water-soluble polymer is believed to be to reduce the solubility of the ink pigment in its carrier, thereby promptly precipitating the pigment prior to penetration into the matrix.

Preferred gelatins are type-A gelatins for vinyl substrates, and type-B gelatins for canvas substrates. Preferred wt % ranges are 2–6 wt % for both vinyl and canvas, more preferably about 4 wt %.

Preferred synthetic water-soluble polymers are based on oxygen or nitrogen heteroatoms, which promote their hydrophilicity. Particularly preferred water-soluble polymers are polyvinyl pyrrolidone, polyethylene oxide, and gum arabic, and combinations thereof. The preferred wt % range for total water-soluble polymer in an ink-receptive top composition is 0.5–3.0 wt %, more preferably about 2 wt %.

Miscellaneous components

Additional components can be, and frequently are, provided in a base or top coating composition of the invention. For example, an alcohol, such as methanol or isopropanol, is usually preferred to adjust the solubilizing ability of the composition. A wetting agent is also typically employed, such as niacin or sapponin. A hardening agent, such as formaldehyde, can also be employed if desired.

An anti-oxidant, such as L-ascorbic acid, sodium bisulfite, or butylated hydroxy toluene (BHT), is also preferred in order to inhibit air oxidation of components in the coating. An antibacterial or antifungal component, such as thymol, is also preferred.

An optical brightener, such as stilbene sulfonate, is also be used to brighten the coating to the observer's eye. A pigment, such as titanium dioxide, can also be provided as desired, especially when the substrate is opaque. A UV inhibitor is also preferred, such as benzotriazol, in order to inhibit darkening of the coating under exposure to ultraviolet radiation. Suitable weight ranges for the above miscellaneous components are readily determined by the skilled practitioner with reference to the examples described hereinbelow.

Coated Products

A coated printing substrate is also contemplated within the present invention. The printing substrate can be of a paper or fibrous nature; however, it typically is composed of a non-paper stock in roll or sheet form.

A preferred non-paper sheet of the invention is printable with a water-based ink. The coated non-paper sheet comprises a non-paper sheet and a dual coating layer. The dual coating layer is comprised of (i) a base coat adhered to the non-paper sheet, the base coat including a first gelatin and a water-soluble polymer; and (ii) a top coat adhered to the base coat, the top coat including a second gelatin, which accepts and retains water from a water-based ink, and a hydrophilic water-soluble polymer. When a water-based ink including water and pigment is applied to the top coat at least some of the water of the ink is absorbed by the second gelatin of the top coat. Also, it is believed that at least some of the hydrophilic water-soluble polymer is dissolved into the water of the ink, thereby causing the ink pigment to be deposited substantially onto the top coat. Consequently, the non-paper sheet is rendered printable with a water-based ink.

Preferred non-paper sheets are selected from woven textiles, plastics, and leather. Particularly preferred sheets are polymeric sheets, which are substantially non-absorptive of a water-based ink, and a web material, such as canvas, which itself is highly absorptive of a water-based ink.

Preferably, the base and top coats of the coated non-paper sheet both comprise an acid-process (Type A) gelatin. Alternatively, and preferably in the case of canvas substrates, the base coat comprises an acid-process (Type A) gelatin, and the top coat comprises an alkaline-process (Type B) gelatin.

A coated non-paper sheet of the invention also includes a base coat polymer. The polymer is preferably selected from the group consisting of homo- or co-polymers of acrylic acid and derivatives thereof. At least one polymer is also present in the top coating of the sheet. This polymer preferably is selected from the group consisting of polyvinyl pyrrolidone, polyethylene oxide and gum arabic.

Whenever a selected substrate is polyvinyl (vinyl), a coated vinyl sheet of the invention rendered printable with a water-based ink, comprises: (i) a polyvinyl sheet; (ii) a base coat adhered to the polyvinyl sheet, the base coat including an acid-process gelatin and an acrylic polymer by which the base coat adheres to the polyvinyl sheet; and (iii) a top coat adhered to the base coat, the top coat including an acid-process gelatin by which the top coat adheres to the base coat, the gelatin also being a receptor of water, and including a hydrophilic water-soluble polymer. Preferably, the acrylic polymer is selected from acrylic acid copolymers, and derivatives thereof, including carboxylated acrylic copolymers. Preferably, the hydrophilic water-soluble polymer is selected from the group consisting of polyvinyl pyrrolidone and polyethylene oxide. When a water-based ink including water and ink pigment is applied to the top coat (ink-receptor layer) the water within the ink is absorbed by the acid-process gelatin of the top coat, and at least a portion of the hydrophilic water-soluble polymer is dissolved into the water of the ink, thereby depositing the ink pigment upon the polyvinyl sheet.

Whenever a selected substrate is a fabric web, such as canvas, the coated fabric web comprises: (i) a fabric web; (ii) a base coat adhered to the fabric web, the base coat including an acid-process gelatin and an acrylic co-polymer by which the base coat adheres to the fabric web; and (iii) a top coat adhered to the base coat, the top coat including an alkaline-process gelatin by which the top coat adheres to the base coat, the gelatin being a receptor of water, and including a hydrophilic water-soluble polymer. Preferably, the acrylic co-polymer is selected from acrylic acid copolymers, and derivatives thereof, including carboxylated acrylic copolymers. Preferably, the hydrophilic water-soluble polymer is selected from the group consisting of polyethylene oxide and gum arabic. When a water-based ink including water and pigment is applied to the top coat the water within the ink is absorbed by the gelatin of the top coat, and at least a portion of the hydrophilic water-soluble polymer is dissolved into the water of the ink, thereby depositing the ink pigment upon the fabric web.

When the web material is porous, a sizing is also preferred in the base and/or top coating. A preferred sizing is rice starch.

Printing System and Method

A printing method of the invention comprises applying a water-based ink to an instant substrate. The substrate is at least coated with a layer adherent to the substrate and hydrophilic so that water from an aqueous-based ink is absorbed into the medium. Preferably, the substrate is coated with an adherent base layer and a hydrophilic top layer. More preferably, the adherent base layer contains a gelatin and a water-soluble polymer, and the hydrophilic top layer contains a gelatin and a water-soluble polymer. Preferably, the ink is applied to the substrate using an ink-jet printer.

A preferred printing system of the invention comprises: (1) an ink jet printer; (2) a substrate coated with an adherent first layer and a hydrophilic second layer, preferably where the adherent first layer contains a gelatin and an adherent polymer and the hydrophilic second layer contains a gelatin and a water-soluble polymer; and (3) means for controllably imprinting a desired ink pattern on the substrate with the ink-jet printer.

The printing system can include a color ink-jet printer, such as a Canon CJ10 (400 dpi) printer, optionally provided with an image processing unit (Lake Success, N.Y.). Another color printer that can be employed is the Hewlett Packard PaintJet XL300 (300 dpi) (Santa Clara, Calif.).

A particularly preferred ink-jet printer is a Novajet II available from ENCAD (San Diego, Calif.). A preferred controlling means for controlling the transfer of stored image data onto the substrate is available from ENCAD and can be integrated with the ink-jet printer.

The following examples are presented solely in order to illustrate certain aspects of the invention and do not in any way limit the scope of the invention.

EXAMPLES

Example 1. Basecoat Formulation for Vinyl Substrates.

Polyvinyl substrates can be prepared for ink jet printing with the following sub-coating composition. The components water (300 mL) and sodium chloride (1.0 g) were combined and heated to about 130° C. to dissolve the salt. The resulting solution was allowed to cool and was combined with Type A gelatin (30 g) (a pork skin derivative obtained from Kraft General Foods or Atlantic Gelatin (Woburn, Mass.). Sodium hydroxide was added to the mixture to adjust the pH to 8.5. Carboxylated acrylic copolymer LS-20 (500 mL) (tradename Glascol available from Allied Colloid (Suffolk, Va.) was added to the mixture.

Other components added were methanol (65 mL), benzotriazol (0.5 g), L-ascorbic acid (0.10 g), thymol (0.1 g), Leucophor B (0.2 g) available from Sandoz Chemicals Corp. (Charlotte, N.C.), niacin 04 (2.5 mL) available from Niacet Corp. (Niagara Falls, N.Y.), saponin (1.0 g) from Birdhausen (St. Louis, Mo.), and formaldehyde (0.6 mL). The viscosity was adjusted as desired by adjusting the temperature and water, e.g., 100 centipoise.

Example 2. Ink Receptor Layer Formulation for Vinyl Substrates

A formulation suitable for applying to the subcoat layer on vinyl substrates as described in Example 1 is prepared as follows. Water (250 mL) is combined with sodium chloride (1 g) and the mixture is heated to dissolve the salt. A Type A gelatin (40 g) is added, such as is commercially available from Kraft General Foods. Polyvinyl pyrrolidone (PVP) is added (10 g), such as PVP K-60, available from BASF (Parsippany, N.J.). Polyethylene oxide (PEO) is added (10 g), such as PEO N-80 available from Union Carbide (Danbury, Conn.). The mixture is stirred and heated as needed in order to dissolve all of the components.

Isopropanol (100 mL) and methanol (200 mL) are added to the above solution. L-ascorbic acid (0.20 g), sodium bisulfite ((0.10 g) are added and glacial acetic acid is added to adjust the pH of the solution to 4.0. Sodium acetate (0.5 g), thymol (0.1 g) are added and an optical brightener such as Leucophor B (0.3 g) is added. Saponin (3 mL) and formaldehyde (0.1 mL of 37% solution) are added. The volume of the formed solution is adjusted to 1.00 L.

Example 3. Basecoat Formulation for Canvas Substrates

A Type A gelatin (35 g) is added with stirring to approximately 300 mL of water. Sodium hydroxide is added to adjust the solution to pH=8.5. Sodium acetate (0.75 g) and copolymer LS-20 (300 mL) are added. Thymol (0.1 g), an optical brightener (0.2 g), and methanol (50 mL) are added. Starch (5 g) is added as sizing agent and titanium dioxide (2.5 g) is added as pigment. Saponin (2.5 mL of 50% concentrate) is added. The volume of the solution is then adjusted to 1.00 L.

Example 4. Ink Receptor Layer Formulation for Canvas Substrates

To 300 mL of water was added 1.0 g of sodium chloride with stirring. A Type B gelatin (40 g), available from Kraft General Foods was added to the solution. Gum arabic (5.0 g), which can be obtained from Meer Corp. (North Bergen, N.J.) was added and polyethylene oxide (15.0 g) was added.

Sodium hydroxide was added to adjust the pH of the solution to 8.0. Methanol (200 mL) and isopropanol (100 mL) were added. Butylated hydroxytoluene (BHT) (1.95 g), which can be obtained from Aldrich Chemical (Milwaukee, Wis.) and thymol (0.2 g) were added. Rice starch (5.0 g) and titanium dioxide (0.5 g) (Rutile 900), obtained from DuPont Chemical Co. (Wilmington, Del.) were added to the solution.

Although the present invention has been described in some detail by way of illustration and example for purposes of clarity and understanding, certain obvious modifications can be practiced within the scope of the appended claims.

What is claimed is:

1. A method for coating a paper-free substrate in preparation for printing thereon with a pigmented aqueous ink having pigment in a water carrier, the method comprising:

applying to the substrate a base coating comprised of a first gelatin and a first organic polymer; and applying to the base coating a hydrophilic top coating composed of a second gelatin in which water of the aqueous ink is absorbed and a second organic polymer reducing solubility of the ink's pigment in the ink's water carrier, which hydrophilic coating both (i) adheres to the base coat and (ii) precipitates pigment from any pigmented aqueous ink that is printed upon the top coating.

2. A method as in claim 1, wherein the first and second gelatins are identical.

3. A method as in claim 1, wherein the first organic polymer is selected from the group consisting of acrylic homopolymers and copolymers, and the second polymer is selected from the group consisting of polyvinyl pyrrolidone, polyethylene oxide, and gum arabic.

4. A method as in claim 1, wherein the substrate is free of paper.

5. A method as in claim 1, wherein the substrate is selected from the group consisting of woven textiles, leather and polymeric sheets or films.

6. A method of preparing a paper-free substrate so that the substrate accepts and retains a water-based ink during printing, the preparation method comprising:

(a) coating a paper-free substrate with a base coat containing a first polymer which chemically adheres to the substrate, and a first gelatin; and (b) coating the base-coated substrate with an ink-receptive top coat containing a second polymer and a second gelatin, which second gelatin adheres to the first gelatin of the base coat and absorbs water from the water-based ink.

7. The method of claim 6, wherein during an application of water-based ink to the base- and top-coated substrate during the process of printing the top coat absorbs water from the ink concurrently with at least some dissolution of the second polymer of the top coat into the ink, where in the ink is fixed to the top coat, and is thus also fixed to the base, and is thus also fixed to the substrate.

8. The substrate preparation method of claim 6 adapted for preparing a polyvinyl substrate wherein the second gelatin of the second coating is an acid-process Type A gelatin.

9. The substrate preparation method of claim 6 adapted for preparing a web substrate wherein the second gelatin of the second coating is an alkaline-process Type B gelatin.

10. The substrate preparation method of claim 6 wherein the first polymer of the base coat is a carboxylated acrylic copolymer.

11. The substrate preparation method of claim 6 wherein the second polymer of the top coat is selected from the group consisting of polyvinyl pyrrolidone, polyethylene oxide, and gum arabic.

12. A substrate prepared by the method of claim 6, the base- and top-coated substrate CHARACTERIZED IN THAT the base coat comprises a water-soluble acrylic copolymer and an acid-process first gelatin, and the top ink-receptive coat comprises a water-soluble second polymer and a second gelatin.

13. A coated sheet printable with a water-based ink, the coated sheet comprising:

a sheet free of paper;

a base coat adhered to the sheet, the base coat including a first gelatin and a water-soluble polymer; and a top coat adhered to the base coat, the top coat including a second gelatin that accepts and retains water from a water-based ink, and a hydrophilic water-soluble polymer, wherein when a water-based ink including water and pigment is applied to the top coat then at least some of the water of the ink is absorbed by the second gelatin of the top coat, and the hydrophilic water-soluble polymer is dissolved into the ink, so that the ink pigment is deposited substantially onto the top coat;

there in the top and the base coats render the sheet printable with the water-based ink.

14. The coated sheet free of paper of claim 13 comprising:

a polymeric sheet which is substantially non-absorptive of the water-based ink.

15. The coated sheet of claim 13, wherein the base and top coats both comprise an acid-process Type A gelatin.

16. The coated sheet of claim 13 wherein the sheet free of paper comprises:

a web material which is absorptive of the water-based ink.

17. The coated sheet of claim 13 wherein the base coat comprises:

an acid-process Type A gelatin; and wherein the top coat comprises:

an alkaline-process Type B gelatin.

18. The coated sheet of claim 13 wherein the base coat polymer is selected from the group consisting of homo- or co-polymers of acrylic acid and derivatives thereof.

19. The coated sheet of claim 13 wherein the top coat polymer is selected from the group consisting of polyvinyl, polyethylene oxide and gum arabic.

20. The coated sheet of claim 13 wherein the base coat further comprises a sizing.

21. A coated vinyl sheet printable with a water-based ink having pigment, the coated vinyl sheet comprising:

a polyvinyl sheet;

a base coat adhered to the polyvinyl sheet, the base coat including an acid-process gelatin and an acrylic co-polymer by action of both which relation and polymer the base coat adheres to the polyvinyl sheet; and a top coat adhered to the base coat, the top coat including (i) an acid-process gelatin by action of which the top coat adheres to the base coat, the gelatin also being a receptor of water, and (ii) a water-soluble hydrophilic polymer, wherein when a water-based ink including water and ink pigment is applied to the top coat then the water within the ink is absorbed by the acid-process gelatin of the top coat, and at least a portion of the hydrophilic water-soluble polymer is dissolved into the ink, there in precipitating a depositing of the ink pigment from the ink onto the polyvinyl sheet.

22. A composition as in claim 21, wherein the acrylic copolymer is selected from the group consisting of copolymers of acrylic acid and derivatives thereof.

23. A composition as in claim 21, wherein the hydrophilic polymer is selected from polyvinyl pyrrolidone and polyethylene oxide.

24. A coated fabric web printable with a water-based ink, the coated fabric web comprising:

a fabric web;

a base coat adhered to the fabric web, the base coat including an acid-process gelatin and an acrylic co-polymer by action of which the base coat adheres to the fabric web; and a top coat adhered to the base coat, the top coat including (i) an alkaline-process gelatin by action of which the top coat adheres to the base coat, the gelatin being a receptor of water, and (ii) a water-soluble hydrophilic polymer, wherein when a water-based ink including water and pigment is applied to the top coat then the water within the ink is absorbed by the gelatin of the top coat, and at least a portion of the hydrophilic water-soluble polymer is dissolved into the water of the ink, there in precipitating depositing of the ink pigment from the ink onto the fabric web.

25. A composition as in claim 24, wherein the acrylic copolymer is selected from the group consisting of copolymers of acrylic acid and derivatives thereof.

26. A composition as in claim 24, wherein the hydrophilic polymer is selected from the group consisting of polyethylene oxide and gum arabic.

27. A printing method comprising applying a water-based ink to a non-porous paper-free substrate, the substrate coated with an adherent base layer and a hydrophilic top layer.

28. A printing method as in claim 27, wherein the adherent base layer contains a gelatin and an adhesive polymer.

29. A printing method as in claim 27, wherein the hydrophilic top layer contains a gelatin and a water-soluble polymer.

30. A printing method as in claim 27, wherein said applying is performed with an ink-jet printer.

31. A printing system comprising;

an ink-jet printer;

a paper-free substrate coated with an adherent first layer and a hydrophilic top-layer; and a computer means for controllably imprinting a desired ink pattern on the substrate with the ink-jet printer.

32. A method for coating a paper-free substrate in preparation for printing thereon comprising:

first applying to the substrate a coating composition containing a gelatin and a polymer adherent to the substrate as a first layer; and second applying a hydrophilic polymer as a second layer.

33. A method as in claim 32, wherein the substrate is a fabric web.

34. A method as in claim 32, wherein the adherent polymer is selected from the group consisting of homo- and copolymers of acrylic acid, and derivatives thereof.

35. A method as in claim 32, wherein the hydrophilic polymer is selected from the group consisting of polyvinyl pyrrolidone, polyethylene oxide and gum arabic.

36. A coated paper-free substrate produced by the method of claim 1 CHARACTERIZED IN THAT a base coating that includes a first organic polymer and a first gelatin adheres to the paper-free substrate, while a top coating that includes a second organic polymer and a second gelatin both (i) adheres to the base coat and (ii) is hydrophilic.

37. A coated paper-free substrate produced by the method of claim 6 CHARACTERIZED IN THAT a base coating, which base coating includes a first polymer chemically adhering to the paper-free substrate and a first gelatin, adheres to the substrate, while a top coating, which top coating includes a second polymer and a second gelatin, both (i) adheres to the base coat and (ii) absorbs water in a water-based ink.

38. A method for coating a paper-free substrate in preparation for printing thereon with a water-based ink comprising:

applying to the paper-free substrate a base coat comprised of a first organic polymer that adheres to the substrate; and applying to the base coat a hydrophilic top coat comprising a hydrophilic material and a water-soluble polymer, which top coat both (i) adheres to the base coating and (ii) absorbs water in the water-based ink.

39. A coated paper-free substrate produced by the method of claim 38 CHARACTERIZED IN THAT a base coat including a first polymer adheres to the substrate, while that a hydrophilic top coat including a hydrophilic material and a water-soluble polymer both (i) adheres to the base coat and (ii) absorbs water in the water-based ink.

40. A coated non-porous paper-free sheet printable with a water-based ink, the coated non-porous paper-free sheet comprising:

a non-porous paper-free sheet;

a base coat, including (i) a water-soluble polymer and (ii) a first material that adhere to the sheet; and a top coat, including (i) a hydrophilic water-soluble polymer and (ii) a second material that adheres to the first material, that both (i) adheres to the base coat, and (ii) absorbs water from a water-based ink.

* * * * *